(12) United States Patent
Weems et al.

(10) Patent No.: US 6,561,233 B2
(45) Date of Patent: May 13, 2003

(54) DUAL CHUCK BLOW GUN

(75) Inventors: James M. Weems, Cedar Rapids, IA (US); Donald A. Nye, Cresco, IA (US); James M. Weems, Marion, IA (US); Douglas A. Thomas, Cedar Rapids, IA (US)

(73) Assignee: Weems Industries, Inc., Marion, IA (US)

( * ) Notice: Subject to any disclaimer, the term of this patent is extended or adjusted under 35 U.S.C. 154(b) by 0 days.

(21) Appl. No.: 10/071,704

(22) Filed: Feb. 8, 2002

(65) Prior Publication Data
US 2002/0166904 A1 Nov. 14, 2002

Related U.S. Application Data

(63) Continuation-in-part of application No. 09/905,380, filed on Jul. 13, 2001
(60) Provisional application No. 60/218,284, filed on Jul. 14, 2000.

(51) Int. Cl.[7] .................................................. B65B 1/04
(52) U.S. Cl. .......................... 141/38; 141/98; 239/600; 239/291
(58) Field of Search .......................... 141/38, 67, 301, 141/302, 98, 392; 239/600, 587.1, 290, 291, 428.5; 152/415

(56) References Cited

U.S. PATENT DOCUMENTS

| 4,798,233 A | 1/1989 | Mooney |
| 5,832,974 A | 11/1998 | Jou |

Primary Examiner—Steven O. Douglas
(74) Attorney, Agent, or Firm—Allan L. Harms

(57) ABSTRACT

A combined compressed air blow gun and tire inflation chuck is disclosed. The tire inflation chuck is fixed to a wand mounted to a handle in which a valve operated by a trigger controls flow of compressed air to the chuck. The chuck includes opposing tire stem receiving openings. An internal plunger in the chuck permits flow of compressed air from the wand through one opening of the chuck when no tire stem is inserted in either tire stem receiving opening in the chuck. When a tire stem is inserted in either opening of the chuck, compressed air is prevented by the plunger from passing to the opposing end of the chuck.

20 Claims, 10 Drawing Sheets

DUAL CHUCK BLOW GUN

CROSS-REFERENCE TO RELATED APPLICATIONS

This application is a continuation-in-part of Ser. No. 09/905,380 filed Jul. 13, 2001 as Dual Chuck Blow Gun. This application claims the benefit under 35 U.S.C. §119(e) and 37 C.F.R. §1.78 of copending U.S. non-provisional patent application Ser. No. 09/905,380 filed Jul. 13, 2001 which claimed the benefit of provisional patent application of serial No. 60/218,284 filed Jul. 14, 2000. The contents of Ser. Nos. 60/218,284 and 09/905,380 are incorporated in this application.

STATEMENT REGARDING FEDERALLY SPONSORED RESEARCH OR DEVELOPMENT

Not Applicable.

BACKGROUND OF THE INVENTION

In the inflation of tires mounted on dual wheel sets, it is customary to use an inflation chuck which comprises an elongate rigid tubular wand coupled at one end to a source of compressed air and having a bi-directional chuck head on the opposing end. The bi-directional chuck head includes two opposing tire inflation valves as are well known, the first valve installed in a coupler being generally disposed in the direction of the axis of the wand and the second valve installed in a second coupler disposed one hundred eighty degrees from the coupler housing the first valve. Having a first coupler in a forward direction facilitates inflation of the tire valve of a first tire of a dual wheel set while the second coupler oriented in a reverse direction facilitates inflation of the other tire of the dual wheel set.

Blow guns are frequently used around large truck tractors for the occasional need to use compressed air to expel debris and dust from a truck trailer or truck cab or sleeper and for other uses. The blow gun is coupled to an air hose coupled to a supply of compressed air which may be the compressor air system of the truck tractor.

There exists a need for a single appliance which may be used to expel debris with compressed air and also to inflate tires without attachment of additional devices. One device currently available is a WORK FORCE™ 2-IN-1 Blow Gun marketed by Legacy Manufacturing Company of Marion, Iowa. This device includes a handle with a trigger valve coupled to a nozzle which will mate with a tire valve of a wheel on which a tire is mounted. This device does not permit satisfactory inflation of dual mounted tires on large trucks.

SUMMARY OF THE INVENTION

The present invention comprises a handle having a trigger lever which opens a valve to permit compressed air from a source hose coupled to the handle to pass through the handle into an elongate wand on the end of which is mounted a two-headed tire inflation chuck member. In one embodiment, the chuck member comprises an elongate two-ended barrel having a side coupling which mounts to the free end of the wand. The elongate barrel is provided with opposing ends, each of which is sized to mate with the valve coupler of a tire valve stem. The first end of the elongate barrel is directed generally toward the handle at about a thirty degree angle from the axis of the wand and is provided with a plunging spring-loaded valve member which is opened when the first end is coupled to a valve stem coupler. Mounting of the first end to a valve stem coupler by insertion of the valve coupler depresses the valve plunger against a spring and opens a passageway from the first end to the valve in the handle. The trigger lever may then be actuated and compressed air permitted to flow down the wand and through the first end of the two-ended barrel.

The opposing second end of the two-headed coupler has an internal passageway which is open to the passageway in the wand when the valve plunger of the first end is not displaced from its rest position biased by the spring toward the first end of the two-headed coupler. A safety nozzle is provided on the second end of the two-ended barrel to permit escape of compressed air if an abutting obstruction such as a user's body part is disposed against the outlet of the second end. When a tire valve stem coupler is inserted within the second end of the two-ended barrel, the safety nozzle is bypassed and compressed air may be transmitted to the tire valve when the trigger of the handle is depressed to open the internal valve of the handle.

In the preferred embodiment, a chuck member is attached to a wand of a blow gun and comprises a body having a longitudinal axis coaxial with an inlet bore formed part way into the body. The wand couples to the inlet bore. A second bore on a second axis passes through the body, the second bore having opposing axial outlets each of which is matable with a tire stem. One outlet is located near the inlet bore opening. The other outlet is longitudinally aligned with the inlet bore but coaxial with the second bore. The inlet bore intersects the second bore inside the body. A plunger is slidable along the second bore and is urged by a spring toward the first outlet in a first position at which it obstructs passage of compressed air from the inlet bore to the first outlet near the wand coupling to the inlet bore. Compressed air can pass from the inlet bore to the second outlet when the plunger is in its first or rest position. When a tire stem is inserted in the first outlet, the plunger is forced inward against the spring and then obstructs passage of air from the inlet bore to the second outlet. This obstruction is achieved by a collar on the plunger which seals the first outlet when the plunger is in its first position or prevents entry of air into the bore near the second outlet when the plunger is in its second deflected position.

It is an object of the invention to provide a versatile inflation tool which provides a combined tire inflation chuck and compressed air blow gun.

A further object of the invention is to provide a valve controlled tire inflation tool with a double ended chuck which may be conveniently used with dual wheel sets in which one tire's valve stem is directed in a direction opposite the valve stem of the adjoining tire.

DESCRIPTION OF THE DRAWING FIGURES

DETAILED DESCRIPTION OF THE INVENTION

Figure 1:
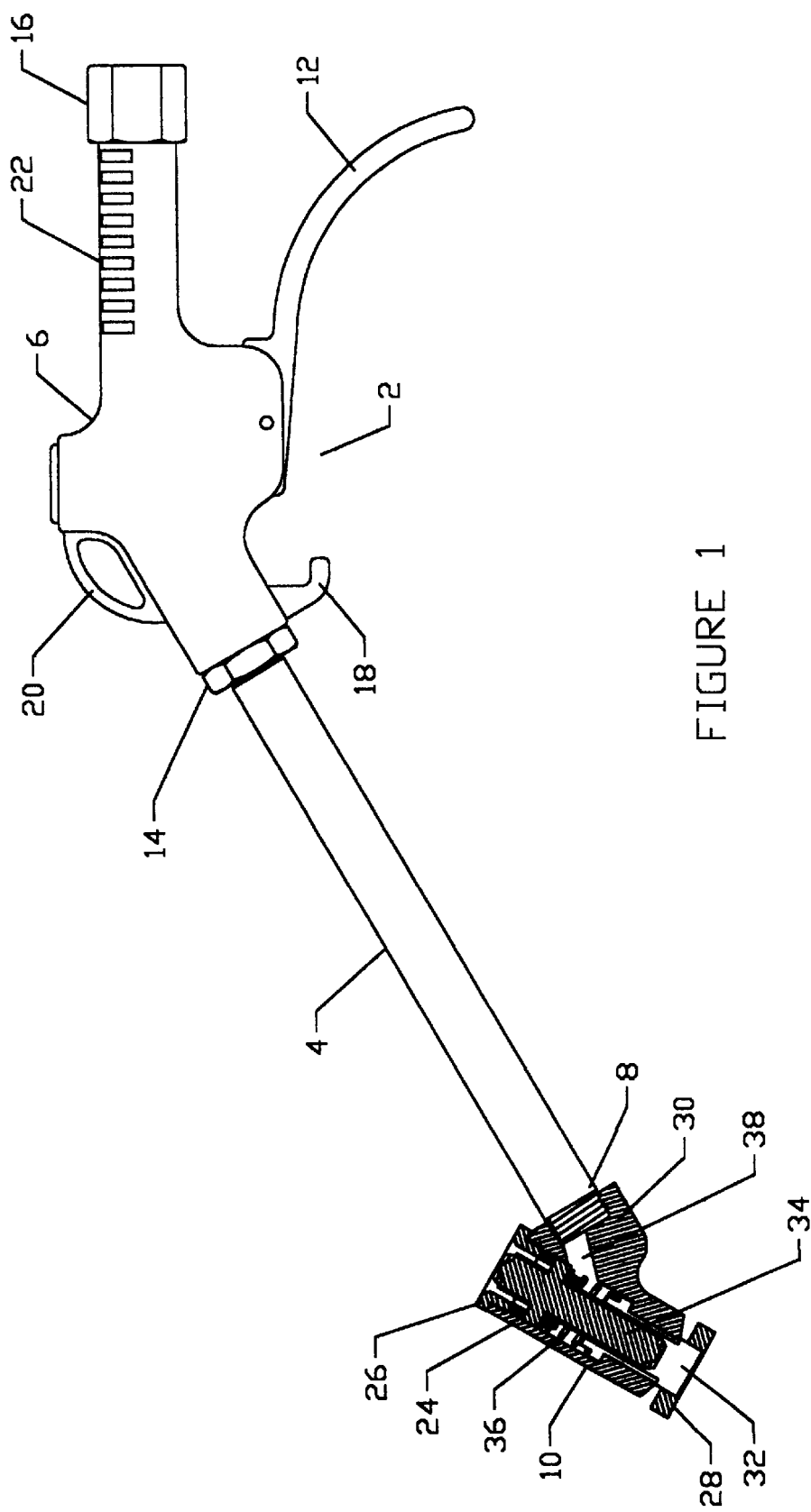
FIG. 1 is a front elevation of a combination blow gun and tire inflator apparatus incorporating an embodiment of the invention, with the inflator valve body shown in cross section.

Throughout this description, like parts are numbered identically.

Referring to FIGS. 1, 2A, 2B, and 2C, the details of one embodiment of invention 2 may be observed. Invention 2 comprises a handle 6 having an elongate wand 4 mounted thereto. Wand 4 is a hollow rigid duct having a free end 8 to which inflator assembly 10 is mounted. Handle 6 is provided with a moveable trigger lever 12 which may be displaced to selectively open an air valve within handle 6. An air passageway is provided through handle 6 which interconnects wand coupling 14 and hose coupling 16 of handle 6. Hose coupling 16 is provided to allow attachment of handle 6 to a supply of compressed air, preferably a compressed air hose. Hook 18 and loop 20 mounted to handle 6 provide mechanical means to suspend or mount invention 2 as desired. Grip 22 is provided on handle 6 to facilitate a user's holding handle 6 in one hand.

Inflator assembly 10 comprises a barrel 24 having opposing first and second ends 26, 28 and angled wand coupling 30. Angled wand coupling 30 is formed on offset protrusion 74 integrally formed on inflator assembly 10. Angled wand coupling 30 is disposed approximately thirty degrees from the axis of barrel 24.

Mounted within bore 32 of barrel 24 is plunger 34. Plunger 34 is biased by spring 36 to rest at first end 26 of barrel 24. Bore 32 includes a reduced diameter segment 76 adjacent second end 28 of barrel 24 and an adjoining enlarged diameter segment 78 which terminates at first end 26 of barrel 24, a shoulder 56 being formed at the junction of enlarged diameter segment 78 and reduced diameter segment 76.

A nonaxial entry passageway 38 is disposed within offset protrusion 74 opening into angled wand coupling 30 and passageway 38 is communicative with bore 32 of barrel 24. However, the action of plunger 34 controls the flow of compressed air from entry passageway 38 to either first end 26 or second end 28 of barrel 24.

Plunger 34 comprises an elongate cylinder 40 having tapered ends 42, 44. Cylinder 40 is provided with collar 46 thereabout which is fixed in position on and moves with cylinder 40. Collar 46 is sized to ride snugly within enlarged diameter segment 78 of bore 32 but is oversized for reduced diameter segment 76 of bore 32. Sleeve 54 slides snugly within reduced diameter segment 76 of bore 32. Sleeve 54 has an enlargement 58 at its inboard end so that movement of sleeve 54 toward second end 28 is limited by abutment of enlargement 58 on shoulder 56. Enlargement 58 may be an outwardly extending lip.

Figure 2A:
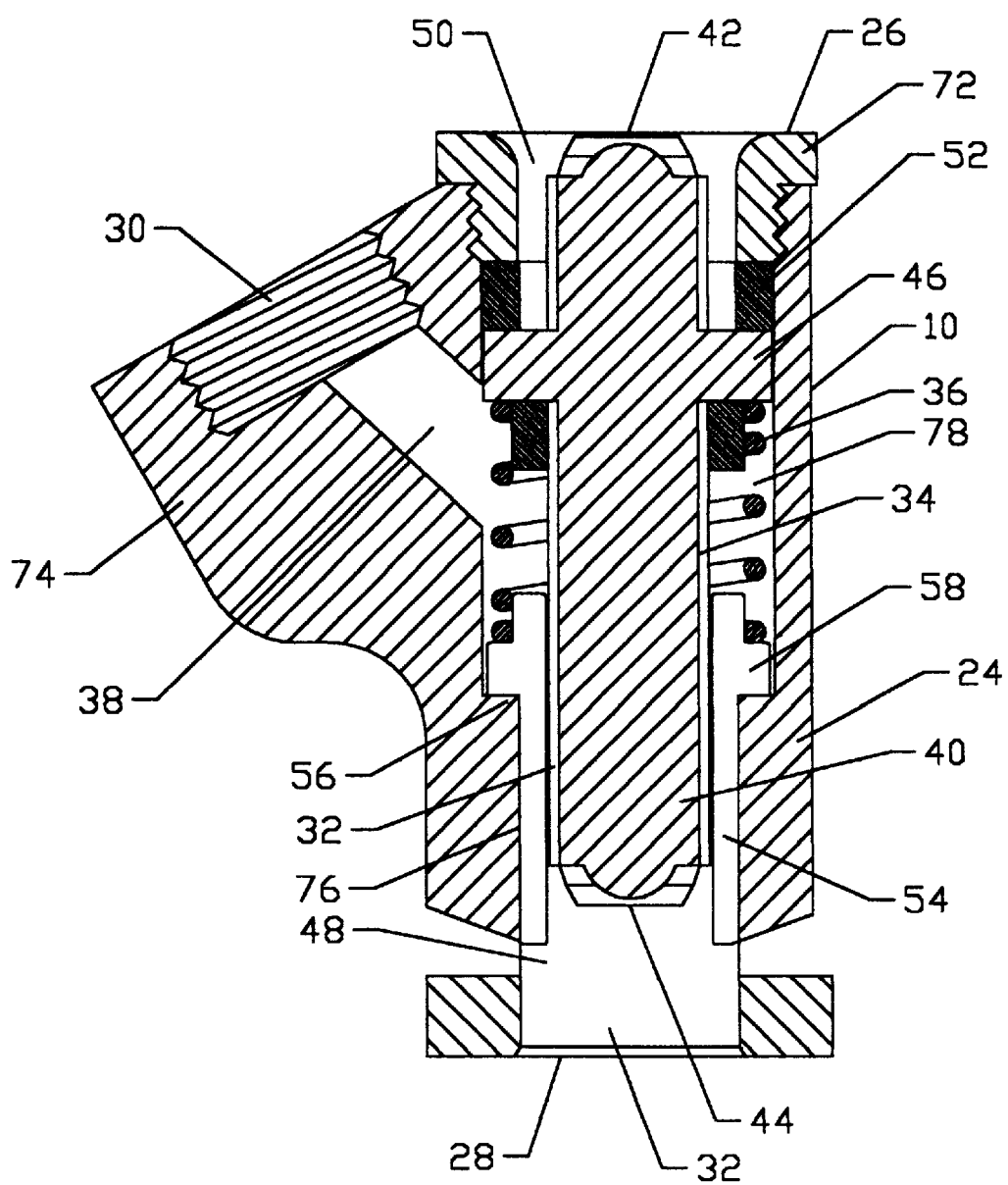
FIG. 2A is a cross section of the inflator valve body of the embodiment of FIG. 1 in its first mode for use as a blow gun.

As seen in FIG. 2A, inflator assembly 10 is ready for use as a blowgun nozzle with plunger 34 disposed maximally toward first end 26 of inflator assembly 10 with first end 42 of cylinder 40 generally flush with first end 26 of inflator assembly 10. In this position, entry passageway 38 is communicative with second segment 48 of axial bore 32. Collar 46 of plunger 34 is disposed to block air movement from entry passageway 38 into first segment 50 of bore 32. Spring 36, preferably a coil spring in compression, urges plunger 34 such that collar 46 abuts resilient sealing ring 52 disposed within first segment 50 of bore 32. Sealing ring 52 serves as a stop for plunger 34. Cap nut 72 is threaded onto first end 26 of barrel 24 to retain resilient sealing ring 52 in position. Sleeve 54 located in second segment 48 of bore 32 is urged at its enlargement 58 against internal shoulder 56 of barrel 24.

Figure 2B:
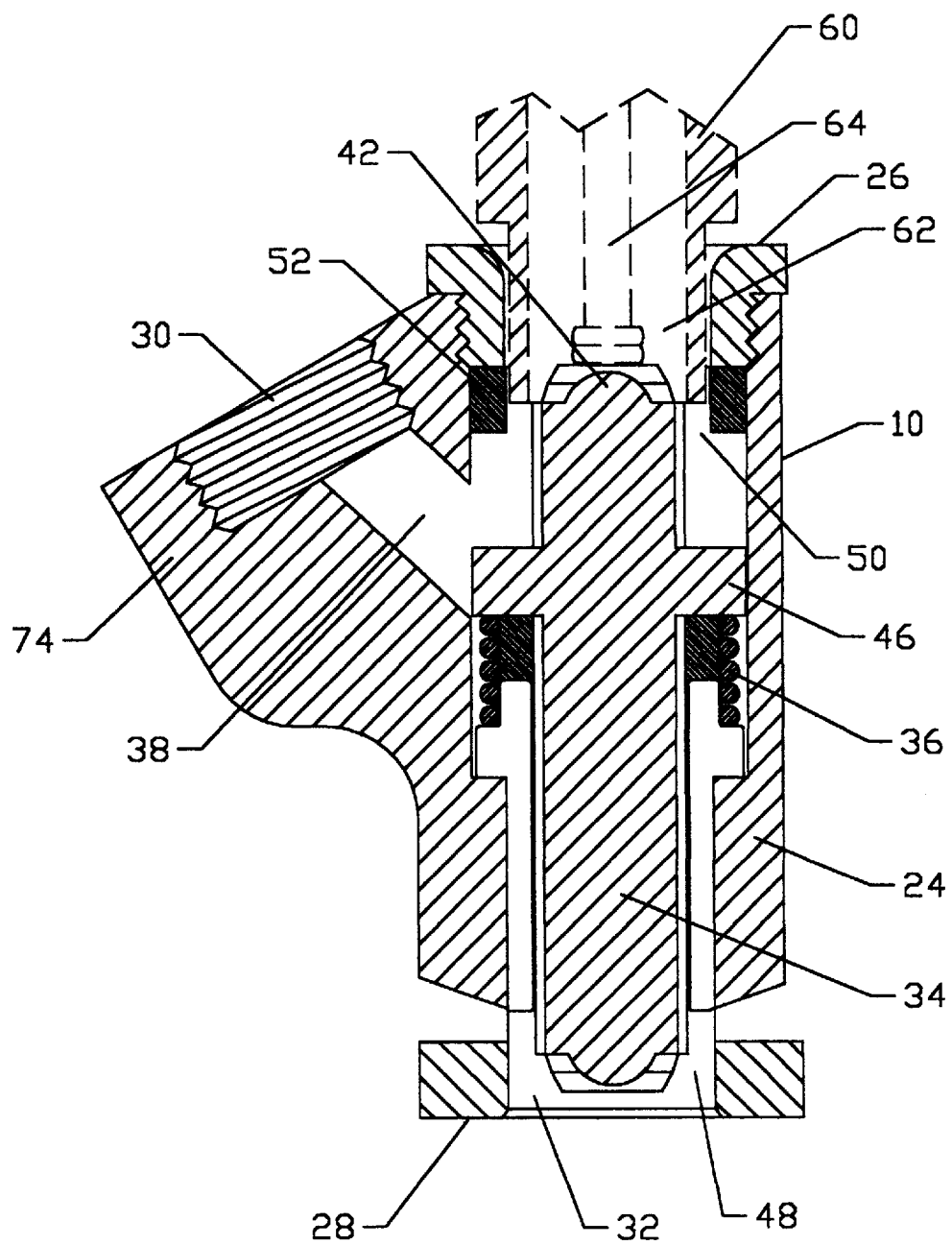
FIG. 2B is a cross section of the inflator valve body of the embodiment of FIG. 1 in its second mode, a tire valve stem being shown inserted into the first end of the inflator valve body.

FIG. 2B depicts inflator assembly 10 engaged with a valve stem 60 of a tire to be inflated. Plunger 34 is urged toward spring 36 thereby compressing it and causing it to resist displacement of sleeve 54 toward first end 26 of barrel 24. Plunger 34 is displaced by the axial force of valve stem coupler 62 upon plunger 34 sufficiently to move collar 46 away from sealing ring 52 to open a passage from entry passageway 38 into first segment 50 of bore 32. When plunger 34 reaches the limit of its travel toward second end 28 of barrel 24, with spring 36 fully compressed, collar 46 is disposed in position to obstruct air passage from entry passageway 38 into second segment 48 of bore 32. First end 42 of cylinder 40 urges valve stem plunger 64 into valve stem 60 thereby opening the valve within valve stem 60. In this position, inflator assembly 10 is useful to inflate a tire through valve stem 60 when the valve operated by trigger lever 12 of handle 6 is opened.

Figure 2C:
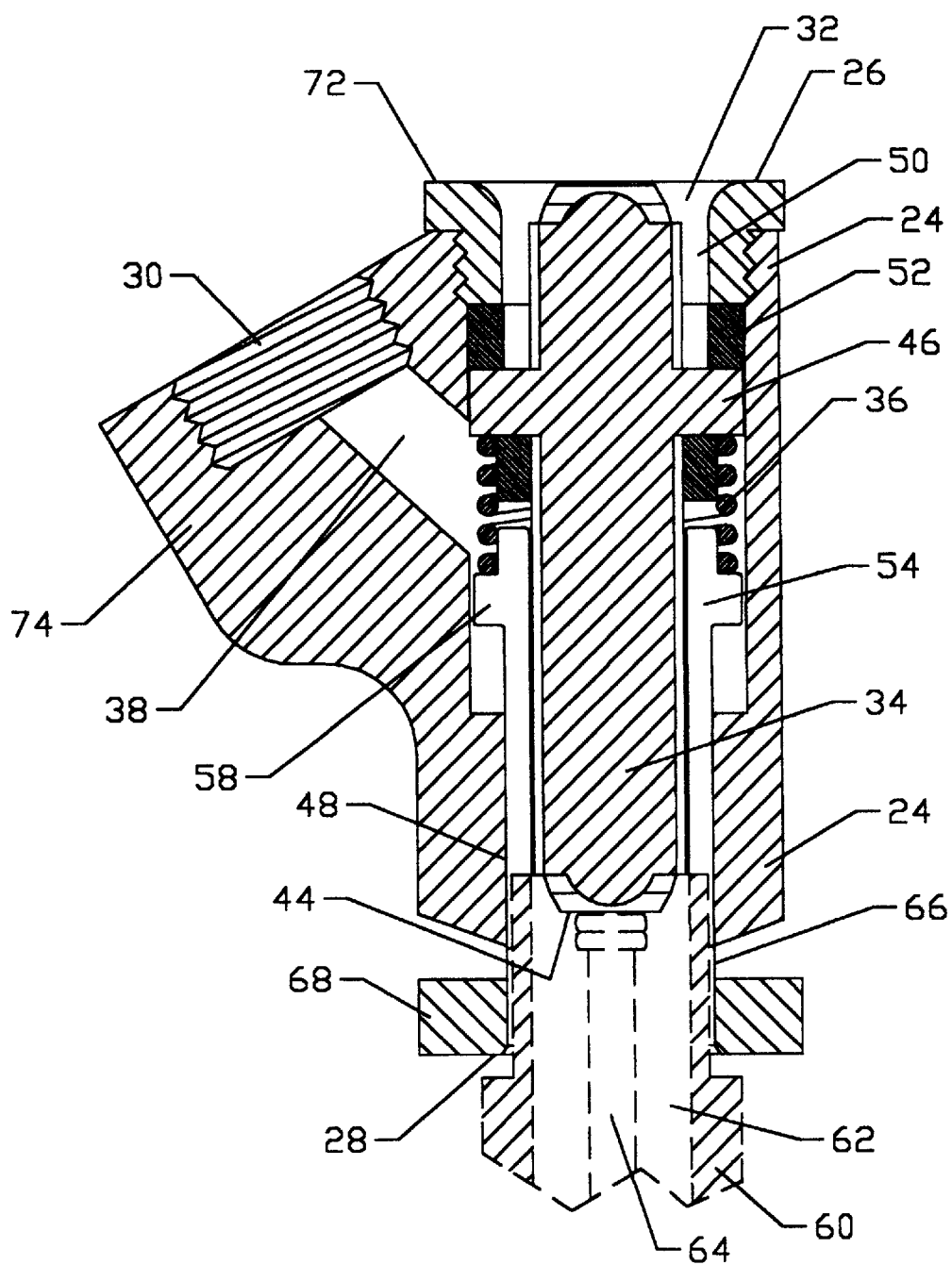
FIG. 2C is a cross section of the inflator valve body of the embodiment of FIG. 1 in its third mode, a tire valve stem being shown inserted into the second end of the inflator valve body.

FIG. 2C illustrates the position of the plunger 34 of inflator assembly 10 when a valve stem coupler 62 of a valve stem 60 is inserted into second segment 48 of bore 32 of barrel 24. Valve stem coupler 62 urges plunger 34 and sleeve 54 along bore 32 toward first end 26 of barrel 24. Collar 46 of plunger 34 is urged by spring 36 into abutment with sealing ring 52 thereby obstructing air flow from entry passageway 38 into first segment 50 of bore 32 while allowing compressed air to flow into second segment 48 of bore 32 to be forced into valve stem 60. Resistive force applied by spring 36 resists movement of sleeve 54 toward first end 26 of barrel 24. Second end 44 of plunger 34 causes valve stem plunger 64 to deflect axially thereby allowing compressed air to flow from wand coupling 30 into valve stem 60.

The insertion of valve stem coupler 62 into second end 28 of barrel 24 closes off pressure relief openings radially located on neck 66 of nozzle member 68 which is mounted at second end 28 of barrel 24. Tire valve stem 60 forces plunger 34 toward first end 26 of barrel 24 causing collar 46 to abut against sealing ring 52. Sleeve 54 is forced inwardly along bore 32 away from second end 28, and enlargement 58 of sleeve 54 urges spring 36 toward first end 26 and spring 36 urges collar 46 against sealing ring 52. Collar 46 moves past entry passageway 38 and permits compressed air to pass from entry passageway 38 into bore 32 toward second end 28 and into valve stem 60.

It may be understood that invention 2 may be used as a blow gun with compressed air permitted to pass into wand 4 when trigger lever 12 is depressed to open an internal valve in handle 6. Compressed air passes through entry passageway 38 of offset protrusion 74 into bore 32 because plunger 34 is urged against sealing ring 52 by spring 36. When a tire valve stem 60 is inserted into first end 26 of barrel 24, plunger 34 is forced against the bias of spring 36 toward second end 28 of barrel 24 and the collar 46 moves toward second end 28 and obstructs passage of compressed air from entry passageway 38 into bore 32 between collar 46 and second end 28.

When a tire valve stem 60 is inserted in second end 28 of barrel 24, plunger 34 and the collar 46 thereon is forced upward against sealing ring 52 by movement of sleeve 54 toward first end 26 of barrel 24 and the passage of compressed air from entry passageway 38 into bore 32 at first end 26 is obstructed.

Figure 3:
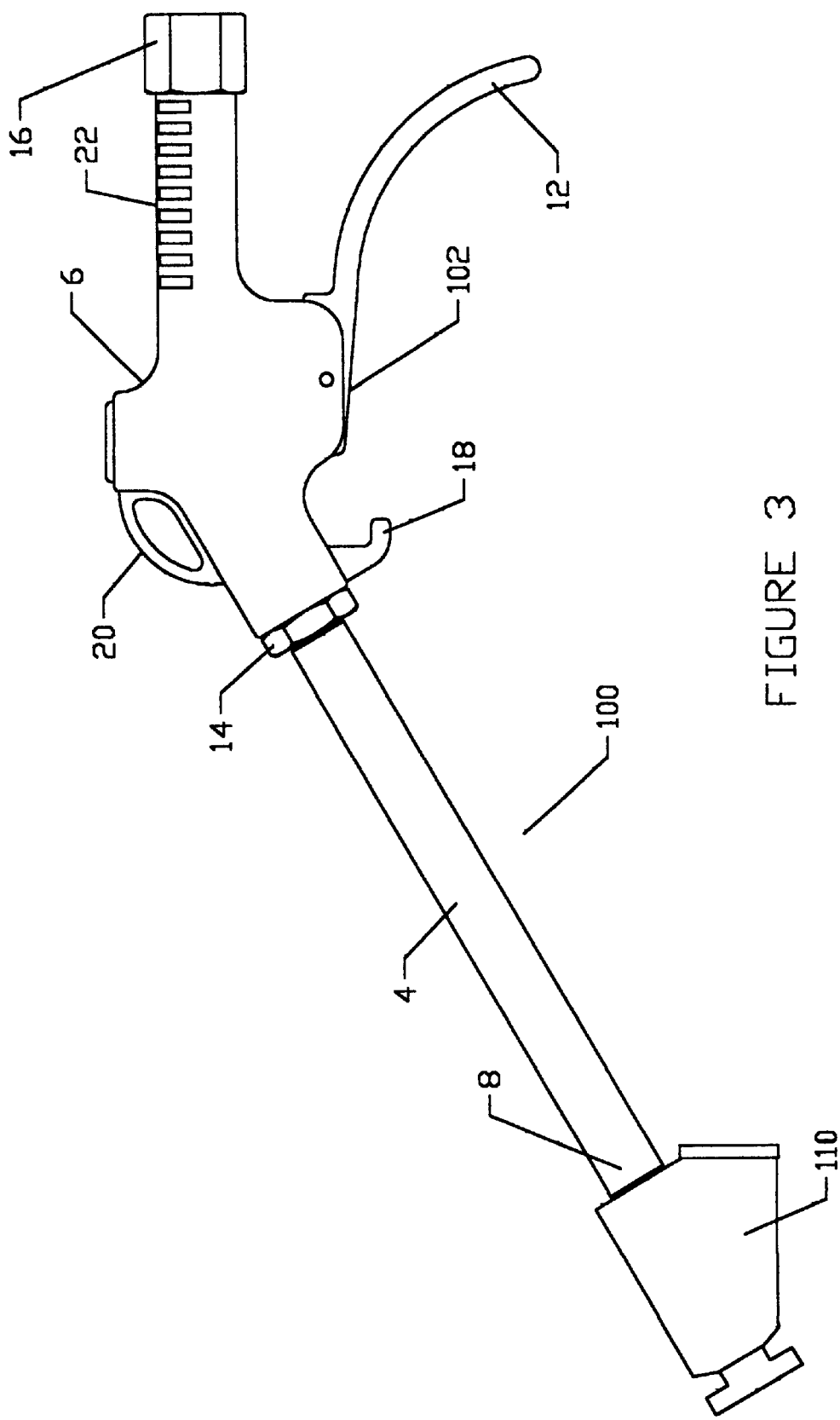
FIG. 3 is a front elevation of the preferred embodiment of the invention.

FIG. 3 depicts the preferred embodiment of combination blow gun and inflator invention 100 which comprises a blow gun 102 coupled to dual chuck member 110. Blow gun 102 comprises a handle 6 joined to a wand 4. Wand 4 is a hollow rigid duct having a free end 8 to which dual chuck member 110 is mounted. Handle 6 is provided with a moveable trigger lever 12 which may be displaced to selectively open an air valve within handle 6. An air passageway is provided through handle 6 which interconnects wand coupling 14 and hose coupling 16 of handle 6. Hose coupling 16 is provided to allow attachment of handle 6 to a supply of compressed air, preferably a compressed air hose. Hook 18 and loop 20 mounted to handle 6 provide mechanical means to suspend or mount invention 2 as desired. Grip 22 is provided on handle 6 to facilitate a user's holding handle 6 in one hand.

Figure 4:
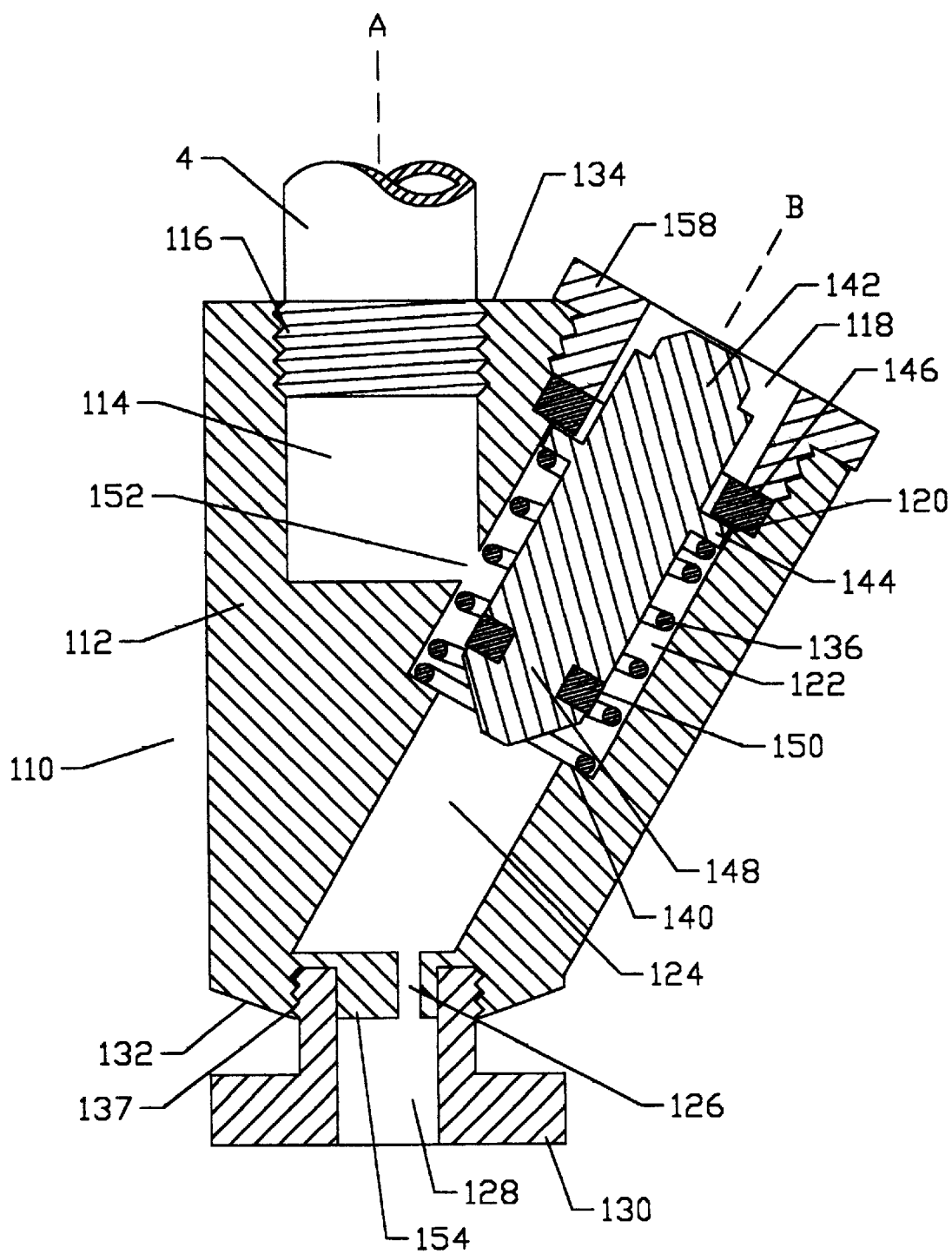
FIG. 4 is cross section of the chuck member of the preferred embodiment of FIG. 3 showing the plunger in its relaxed position.

Referring particularly to FIG. 4, dual chuck member 110 is shown with plunger 142 in its first position. Dual chuck member 110 comprises a body 112 having an axial intake bore 114 formed part way into body 112. Intake bore 114 is provided at first end 134 thereof with threads 116 at least partially therealong, bore 114 being sized to receive the outer threaded free end 8 of wand 4 such that the passageway within wand 4 is communicative with bore 114. Body 112 further comprises an angular bore 118 therethrough which intersects bore 114 along its length. Angular bore 118 of body 112 has an axis B which is preferably rotated about thirty degrees from the main longitudinal axis A of body 112.

Angular bore 118 includes a first segment 120 coaxially joined to a second segment 122 having a smaller diameter than first segment 120. Second segment 122 is also coaxially joined to third segment 124 which has a smaller diameter than second segment 122. Third segment 124 is joined to orifice 126 which is communicative to vent 128 of first end cap 130. End cap 130 mechanically mounts to second end 132 of body 112 such as by threaded coupling to annular groove 137.

Positioned within second segment 122 of angular bore 118 is a coil spring 136 which abuts shelf 140 formed by the narrowing of bore 118 at the junction between third segment 124 and second segment 122. A plunger 142 is disposed within angular bore 118 and is longitudinally slidable therealong. Plunger 142 comprises an integral collar 144 which is sized such that its diameter is marginally smaller than that of second segment 122 of angular bore 118. When plunger 142 is in its first position, collar 144 is urged by spring 136 into abutment with first seal 146 which is preferably a flat elastomeric ring. Seal 146 is retained in first segment 120 by first end cap 158 which is screwed into the threaded opening of angular bore 118 at first end 134 of body 112. When spring 136 is maximally released within the constraints of shelf 140 and collar 144, plunger 142 rests in angular bore 118 such that its narrow 148 surrounded by elastomeric O-ring 150 is displaced from third segment 124 of bore 118 and rests in second segment 122 of bore 118. Compressed air allowed to pass into passageway 114 by action of the internal valve of handle 6 may thereby pass through gap 152 and enter bore 118 and pass without obstruction through orifice 126 into vent 128 to be expelled therefrom. When plunger 142 is in its first position, invention 100 may be used as a blow gun. When a tire stem (not shown in FIG. 4) is inserted into vent 128, the valve plunger of the tire stem is deflected by projecting deflector 154 which projects into orifice 126. When the valve of handle 6 is opened, compressed air can be passed into the tire stem through orifice 126.

Figure 5:
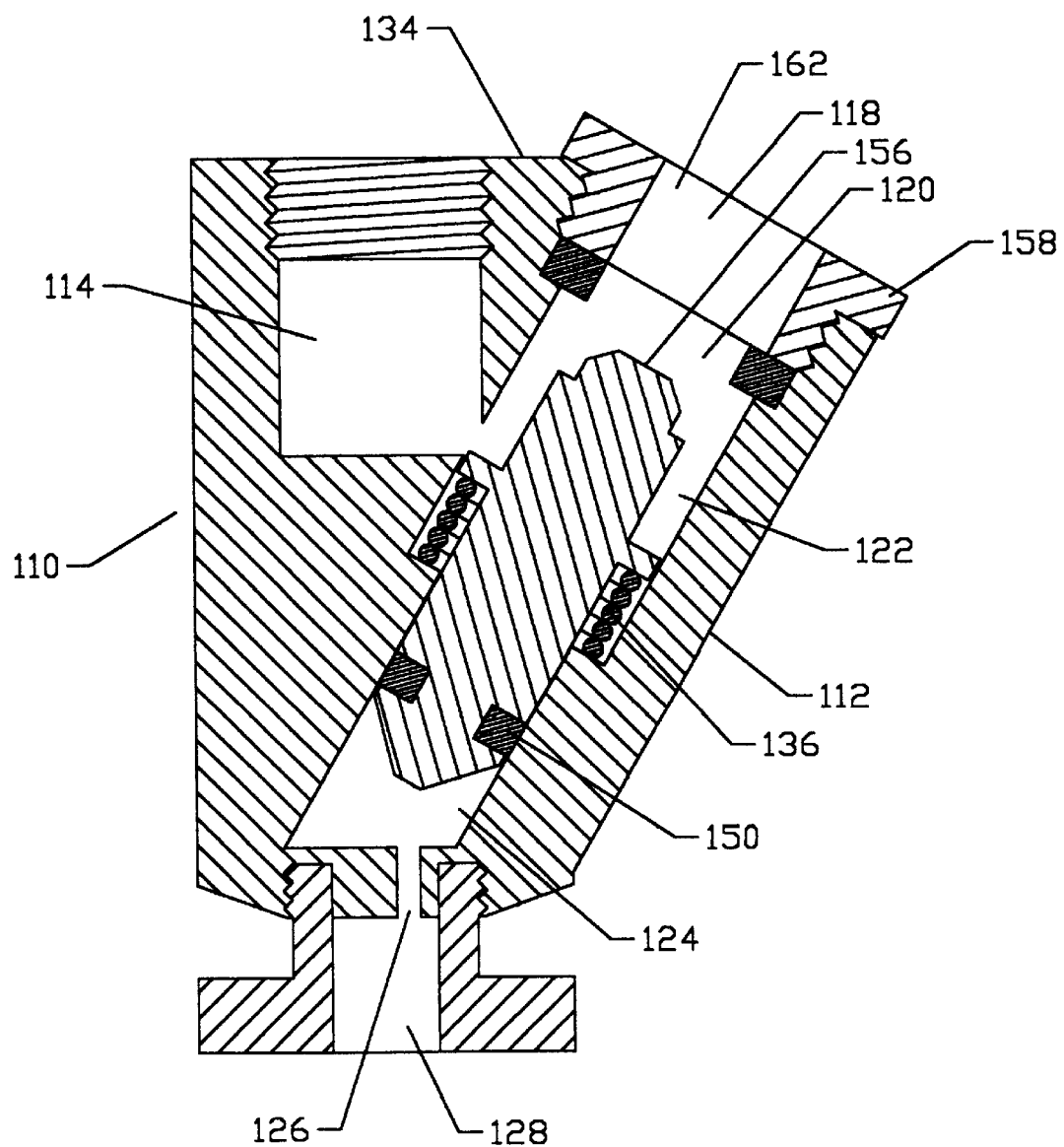
FIG. 5 is a cross section of the chuck member of the preferred embodiment of FIG. 3 showing the plunger in its deflected position.

In FIG. 5, dual chuck member 110 is shown with plunger 142 in its second position having been urged along angular bore 118 by a tire stem (not shown) inserted into central cavity 162 of first end cap 158. When plunger 142 has been moved to its second position, the plunger 142 obstructs passage of air from axial bore 114 toward orifice 126. Instead, air may pass through gap 152 into first segment 120 of angular bore 118. Axial force upon first end 156 of plunger 142 causes spring 136 to compress and O-ring 150 on plunger 142 creates an air seal along third segment 124 such that air in axial bore 114 may not pass to orifice 126.

Plunger 142 will only be forced into its second position when a tire stem is inserted into angular bore 118 at first end 134 to urge plunger 142 to compress spring 136. Inflation of a tire through a tire stem inserted in central cavity 162 can thereby be accomplished by opening the internal valve of handle 6 by actuation of trigger lever 12.

The dual chuck member 110 is useful to inflate dual wheel sets of truck tires since second end cap 130 can be placed around the tire stem of the inboard tire, the deflector 156 can depress the tire stem's valve stem and compressed air can be allowed to pass through handle 6 into wand 4 and then into dual chuck member 110 when trigger lever 12 is actuated to open the internal valve in handle 6. After the inboard tire of a dual wheel set has been inflated, the tire stem of the outboard tire of the dual wheel set can be received in end cap 158 and bore 118 thereby forcing plunger 142 into its second position, whereby compressed air can be selectively passed to the tire stem of the outboard wheel.

If no tire stem is received within either end cap 130 or 158, the invention 100 can be used as a trigger operated blow gun because compressed air in axial bore 114 will pass through orifice 126 without obstruction.

Figure 6:
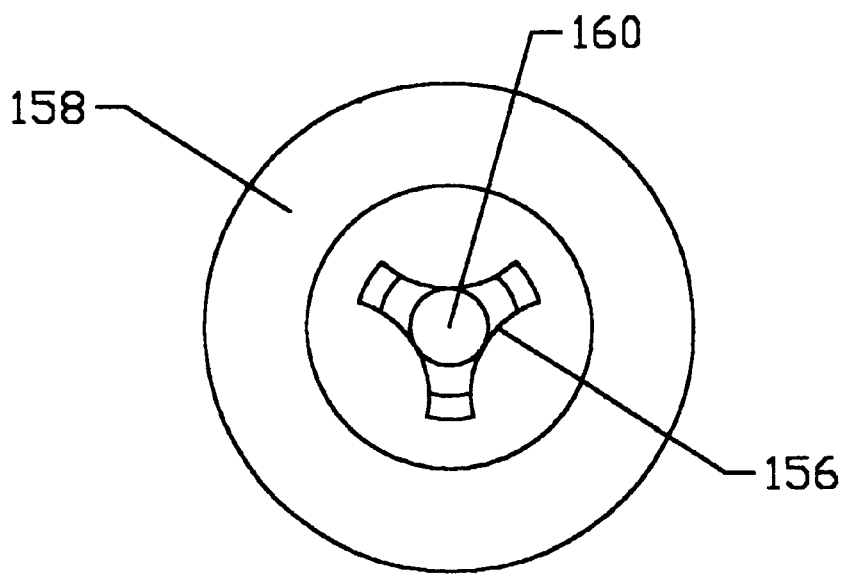
FIG. 6 is an isolated end view of the first outlet of the dual chuck member of FIGS. 4 and 5.

FIG. 6 shows an isolated end view of the axial bore 118 and first end cap 158 when plunger 142 is disposed in its first position. Plunger 142 includes a three-spoked, tapered first end 156 with central button 160 which is employed to depress the valve plunger of a tire stem (not illustrated in FIGS. 4–7) when such a tire stem is inserted in bore 118 through first end cap 158.

Figure 7:
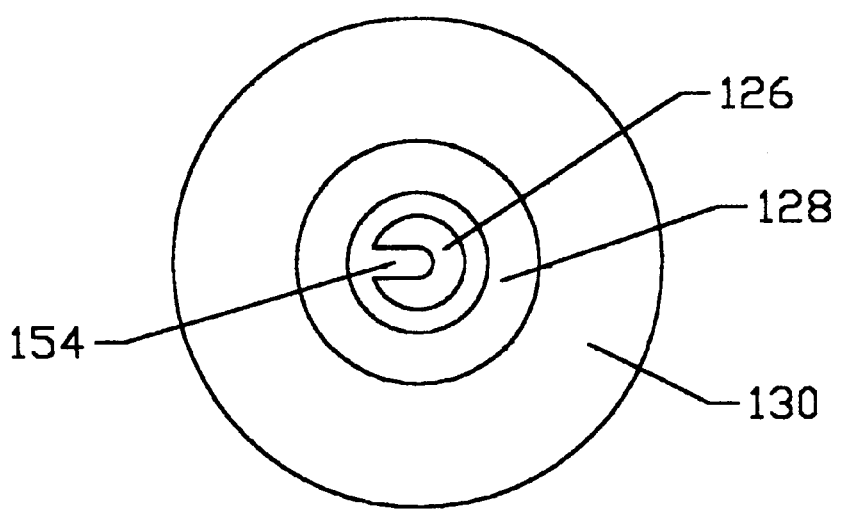
FIG. 7 is an isolated end view of the second outlet of the dual chuck member of FIGS. 4 and 5.

FIG. 7 shows an isolated end view of second end cap 130 and orifice 126. Second end cap 130 surrounds vent 128 and deflector 154 is seen to protrude into orifice 126.

Figure 8:
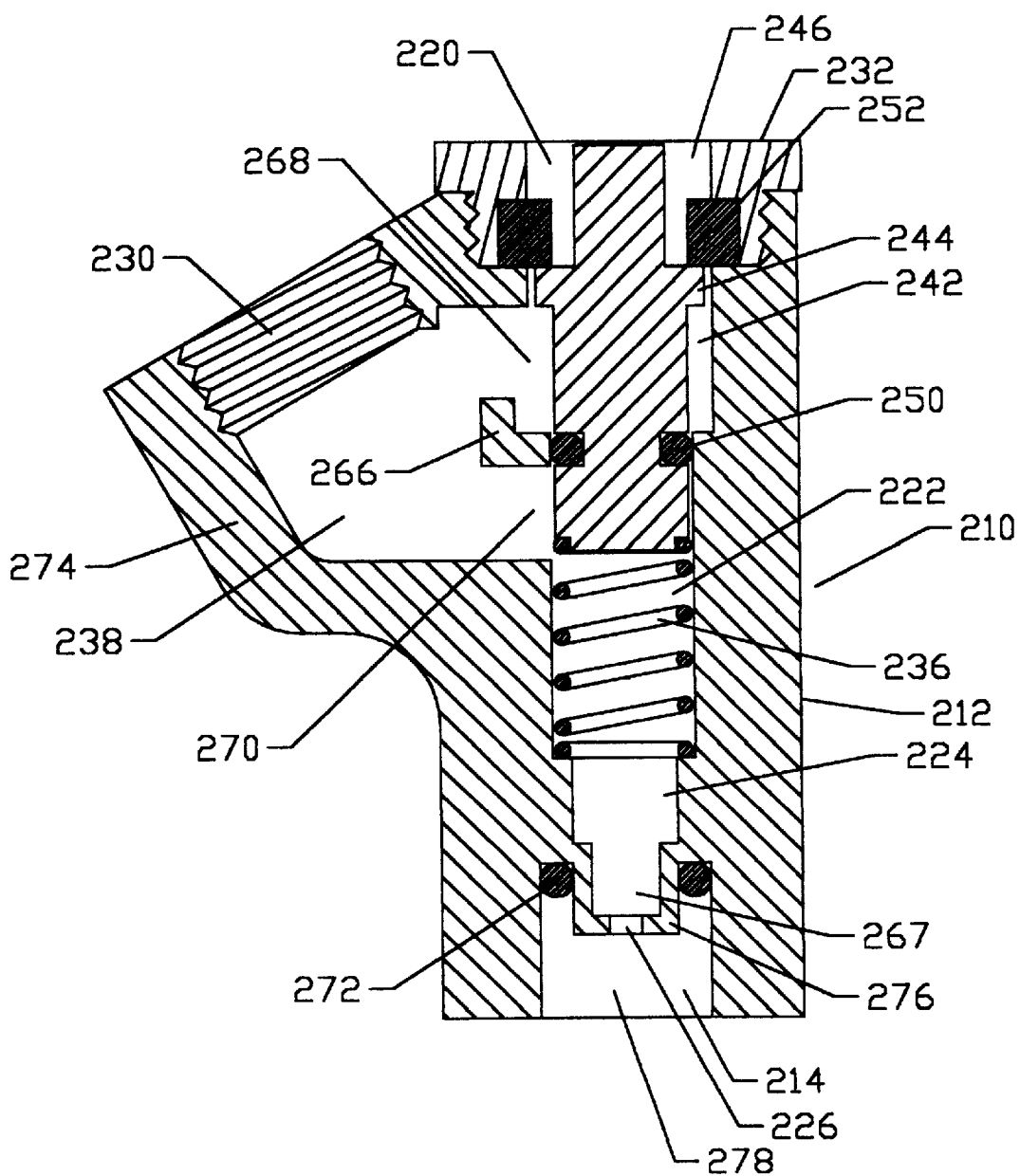
FIG. 8 is a cross section of a chuck member of an alternative embodiment of the invention, with the plunger in its first relaxed position.

FIG. 8 illustrates another alternate embodiment of the inflation chuck 210 of the invention. Chuck 210 comprises an elongate body 212 having an axial bore 214 therethrough. The body 212 is non-symmetrical having an integrated extension 274 through which a passageway 238 is formed, the passageway 238 intersecting axial bore 214 at one end and terminating at wand coupling 230 at its other end. A divider 266 separates passageway 238 into first port 268 and second port 270, each of which is communicative with axial bore 214. Axial bore 214 includes a first section 220 which receives an elastomeric ring seal 252 retained at the outer end of first section 220 by first end cap 232 which screw mounts within first section 220. Axial bore 214 terminates at its second end 267 with nozzle vent 226. Intermediate between third section 224 and first section 220 of axial bore 214 is mid section 222 along which plunger 234 is freely slidable. Plunger 234 includes an annular groove in which an O-ring 250 is carried. A coil spring 236 urges plunger 234 toward first end 234 of axial bore 214 such that the collar 244 of plunger 234 is abutted against ring seal 254. In this position of plunger 234, air within passageway 238 may pass into midsection 222 and be discharged through nozzle vent 226.

A second ring seal 272 is installed in outlet 278 surrounding nozzle 276. A tire stem (not shown) may be inserted in outlet 278 and abutted against nozzle 276 and second ring seal 272 such that compressed air injected into passageway 238 will pass through mid section 222 and through nozzle vent 226 into the tire stem. If no tire stem is present in outlet 278, then nozzle 276 may serve as the nozzle of a blow gun. When a tire stem is inserted into first section 220 of bore 214, it will urge plunger 234 to overcome the force of spring 236 thereby moving to a position which obstructs second port 270 but allows compressed air to pass from passageway 238 through first port 268 into first section 220 to be used to inflate a tire whose tire stem is displacing plunger 242.

Figure 9:
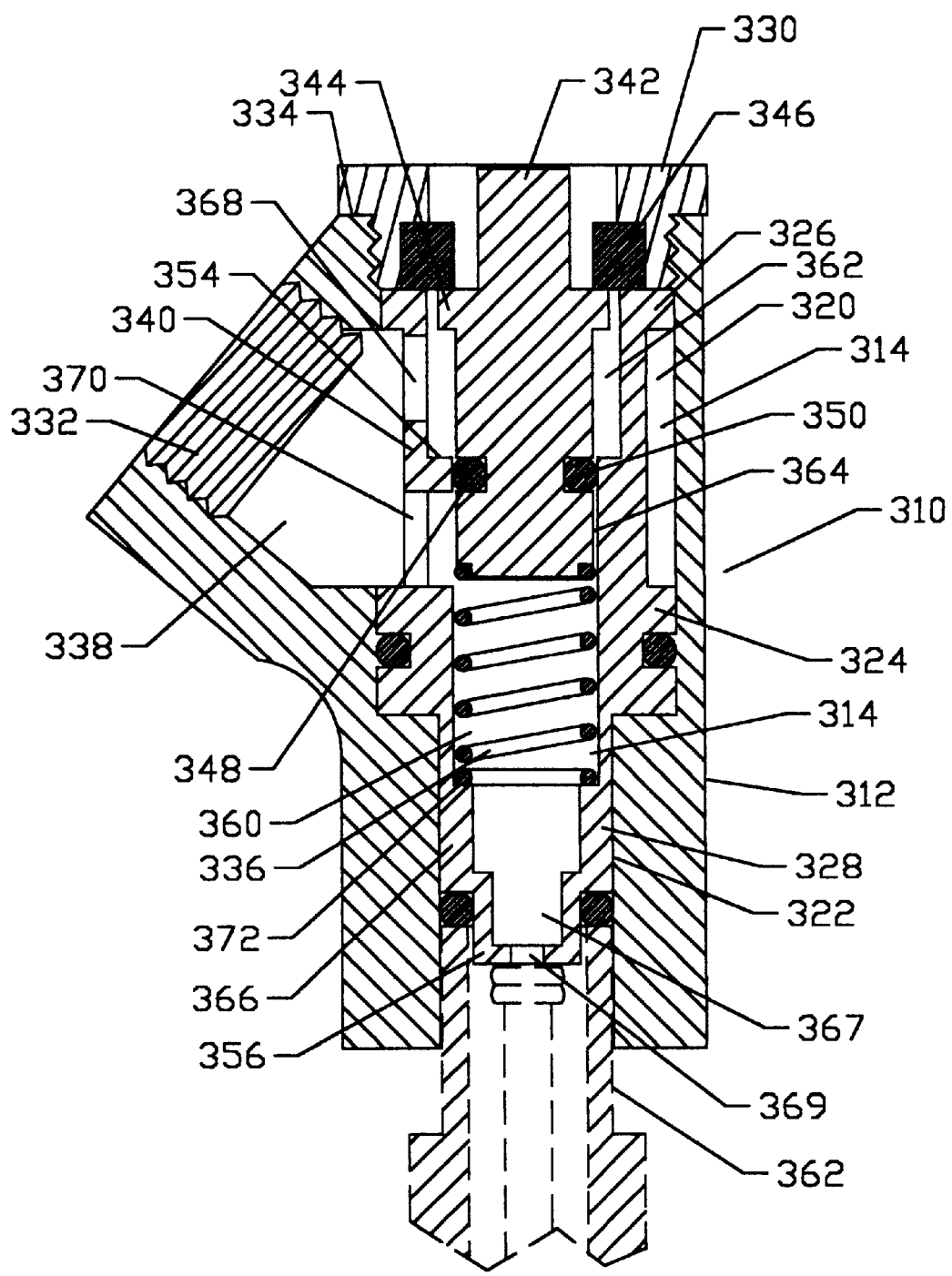
FIG. 9 is a cross section of a chuck member of another alternative embodiment of the invention.

FIG. 9 discloses another alternate embodiment of the chuck member 310 of the invention. This alternative operates identically to that described with reference to FIG. 8. However, the embodiment of FIG. 9 is constructed with a body 312 having an axial bore 314 comprising a large diameter segment 320 joined to a smaller diameter segment 322. An insert 324 is snugly fit into bore 314, the insert 324 having a large diameter part 326 axially joined to a smaller diameter part 328. The smaller diameter element 328 installs in the smaller diameter segment 322 of bore 314 while the larger diameter segment 328 of insert 324 installs in the larger diameter segment 320 of bore 314.

End cap 330 screws into bore 314 at first end 334 of body 312 and compresses seal ring 346 to maintain insert 324 in place in bore 314. Insert 324 includes two radial openings 368 and 370 oriented toward throat 338. Radial openings 368 and 370 are longitudinally spaced apart a small distance along the sidewall 340 of insert 324.

Body 314 is also provided with throat 338 which opens to the exterior of body 314 at wand coupling 332 and is communicative with axial bore 314 through radial openings 368 and 370. Plunger 342 is slideably moveable along internal axial bore 360 of insert 324 and is urged by spring 336 toward first end 334 of body 312. Plunger 342 includes integrally formed collar 344 which abuts seal ring 346 when plunger 342 is at rest. When plunger 342 is displaced against the bias of spring 336, collar 344 acts as a stop against the shelf 354 formed where internal bore 360 narrows from its first largest diameter segment 362 to second intermediate diameter segment 364. Spring 336 rests upon shoulder 372 formed where second intermediate diameter segment 364 of internal bore 360 joins third smaller diameter segment 366 thereof. Internal bore 360 narrows to nozzle bore 367 and terminates with nozzle opening 369.

Plunger 342 is displaceable from its rest position to a second position at which the annular groove 348 with sealing O-ring 350 riding therein is disposed along internal bore 360 such that the plunger 342 obstructs second radial opening 370 of sidewall 340. In its second position, plunger 342 permits passage of compressed air to pass from throat 338 through first radial opening 368 so that a tire stem (not shown) inserted into bore 214 via end cap 330 may be inflated. When plunger 342 is at rest, compressed air may pass from throat 338 to nozzle opening 369 through the internal bore 360 of insert 324 as shown in FIG. 9 where a tire stem 362 is shown abutted against nozzle 356.

Having described the invention, we claim:

1. Combination compressed air blow gun and tire inflation apparatus comprising a handle having a passageway therethrough, a selectively operable valve associated with the handle to control passage of compressed air through the passageway of the handle, an elongate wand mounted at a first end thereof to the handle, the wand having a passageway therethrough communicative with the passageway of the handle, the wand having a free end opposing the first end thereof, a tire inflation chuck mounted to the free end of the wand, the tire inflation chuck comprising an elongate body having at least first, second and third openings, the tire inflation chuck mounted at the first opening thereof to the wand, the body having a first bore part way thereinto, the first bore terminating at the first opening of the body and communicative with the passageway of the wand, the body having a second bore therethrough communicative with the second and the third openings thereof, the first bore communicative with the second bore along the length of the second bore, a plunger slidably moveable along the second bore of the body, a spring element urging the plunger toward a first position adjacent the second opening of the body, the plunger axially moveable to a second position spaced apart from the second opening of the body, the plunger obstructing passage of air from the first bore to the second opening of the body when the plunger is in its first position, the plunger obstructing passage of air from the first bore to the third opening of the body when the plunger is in its second position.

2. The combination compressed air blow gun and tire inflation apparatus of claim 1 wherein the second bore has a first larger diameter segment adjoining the second opening of the body joined coaxially to a second smaller diameter segment adjoining the third opening of the body, the plunger having a annular collar disposed along the length thereof, the annular collar of the plunger of larger diameter than the diameter of the smaller diameter segment of the second bore.

3. The combination compressed air blow gun and tire inflation apparatus of claim 2 wherein a shelf is disposed at the junction of the smaller diameter segment and the larger diameter segment of the second bore, the spring is a coil spring interposed between the shelf and the annular collar of the plunger.

4. The combination compressed air blow gun and tire inflation apparatus of claim 3 wherein the annular collar of the plunger is integral therewith.

5. The combination compressed air blow gun and tire inflation apparatus of claim 4 wherein
   a cap nut is selectively mounted to the body at the second opening thereof,
   the cap nut coaxial with the second bore,
   a ring seal disposed within the second bore adjacent the cap nut,
   the annular collar of the plunger abutting the ring seal when the plunger is in its first position.

6. The combination compressed air blow gun and tire inflation apparatus of claim 5 wherein
   the plunger has a first end and a second end,
   the first end of the plunger adjacent the second end of the body when the plunger is in its first position,
   the plunger having an O-ring spaced apart from the second end thereof,
   the O-ring restricting passage of air along the smaller diameter segment of the second bore when the plunger is in its second position.

7. The combination compressed air blow gun and tire inflation apparatus of claim 6 wherein
   a narrow deflector protrudes into the third opening of the body.

8. The combination compressed air blow gun and tire inflation apparatus of claim 7 wherein
   the collar having an outer diameter generally conforming to the diameter of the enlarged segment of the second bore,
   the coil spring urging the collar of the plunger into abutment with the ring seal when the plunger is in its first position,
   the collar of the plunger compressing the coil spring when a tire valve stem is inserted into the first opening of the elongate body.

9. Combination compressed air blow gun and tire inflation apparatus comprising
   a handle having a passageway therethrough,
   a selectively operable valve mounted to the handle to control passage of compressed air through the passageway of the handle,
   an elongate wand having opposing first and second ends mounted at the first end thereof to the handle,
   the wand having a longitudinal passageway therethrough communicative with the passageway of the handle,
   a tire inflation chuck mounted to the second end of the wand,
   the tire inflation chuck comprising a body having an inlet port and at least two outlets,
   the inlet port mounted to the free end of the wand,
   the body having a first bore communicative with the inlet port,
   the first bore communicative with the passageway of the wand,
   the body having a second bore therethrough interconnecting the at least two outlets,
   the first bore communicative with the second bore of the body,
   only one of the at least two outlets communicative with the first bore at any one time.

10. The combination compressed air blow gun and tire inflation apparatus of claim 9 wherein
    the second bore of the body is linear,
    the at least two outlets are first and second outlets,
    a plunger slidably moveable along the second bore of the body,
    a spring element urging the plunger toward a first position adjacent a first outlet of the body,
    the plunger axially moveable to a second position against the bias of the spring element,
    the plunger obstructing passage of air from the first bore to the first outlet of the body when the plunger is in its first position,
    the plunger obstructing passage of air from the first bore to the second outlet of the body when the plunger is in its second position.

11. The combination compressed air blow gun and tire inflation apparatus of claim 10 wherein
    the second bore has a first larger diameter segment adjoining the first outlet of the body joined coaxially to a second smaller diameter segment adjoining the second outlet,
    the plunger having a annular collar disposed along the length thereof,
    the annular collar of the plunger of larger diameter than the diameter of the smaller diameter segment of the second bore.

12. The combination compressed air blow gun and tire inflation apparatus of claim 11 wherein
    a shelf is disposed at the junction of the smaller diameter segment and the larger diameter segment of the second bore,
    the spring is a coil spring interposed between the shelf and the annular collar of the plunger.

13. The combination compressed air blow gun and tire inflation apparatus of claim 11 wherein
    the annular collar of the plunger is integral therewith.

14. The combination compressed air blow gun and tire inflation apparatus of claim 11 wherein
    a cap nut is selectively mounted to the body within the first outlet thereof,
    the cap nut coaxial with the second bore,
    a ring seal disposed within the second bore adjacent the cap nut,
    the annular collar of the plunger abutting the ring seal when the plunger is in its first position.

15. The combination compressed air blow gun and tire inflation apparatus of claim 10 wherein
    the plunger has a first end and a second end,
    the first end of the plunger adjacent the first outlet when the plunger is in its first position,
    the plunger having an O-ring spaced apart from the second end thereof,
    the O-ring restricting passage of air along the smaller diameter segment of the second bore when the plunger is in its second position.

16. The combination compressed air blow gun and tire inflation apparatus of claim 10 wherein
    the second outlet has a narrow deflector disposed part way thereacross.

17. The combination compressed air blow gun and tire inflation apparatus of claim 11 wherein
    an annular groove is formed in the body concentric with the second outlet,
    a second cap nut is mounted within the annular groove,
    the second cap nut having an opening therethrough communicative with the smaller diameter segment of the second bore, the opening of the second cap nut sized to receive a tire stem therein.

18. The combination compressed air blow gun and tire inflation apparatus of claim 9 wherein one of the at least two outlets is a first tire valve stem receiving opening, another of the at least two outlets is a second tire valve stem receiving opening, the second bore being coaxial with the body, the first valve stem receiving opening coaxial with the second tire valve stem receiving opening, an elongate plunger slidably moveable along the second bore, the second bore having an enlarged diameter segment and a reduced diameter segment adjoined thereto, the plunger having a collar fixed therealong, the collar having an outer diameter generally conforming to the diameter of the enlarged segment of the second bore, a sleeve slidably moveable along the second bore, the sleeve having an inboard end and an elongate segment, the inboard end of the sleeve having an outwardly extending lip thereon, the lip having a diameter larger than the diameter of the reduced diameter segment of the second bore, the elongate segment of the sleeve slidable along the reduced diameter segment of the second bore, a biasing element disposed in the bore between the collar and the lip of the sleeve, a stop element disposed in the bore outboard of the collar of the plunger, the biasing element urging the plunger into abutment with the stop element when the plunger is at rest, the body having opposing first and second ends, the first end of the body adjacent the enlarged diameter segment of the second bore, the collar of the plunger compressing the biasing element when a tire valve stem is inserted into the first valve stem receiving opening, the sleeve displaceable away from the second end of the second bore when a tire valve stem is inserted into the second valve stem receiving opening, the collar obstructing passage of compressed air from the first bore into the first valve stem receiving opening when the plunger is at rest, the collar obstructing passage of compressed air from the first bore into the first valve stem receiving opening when a tire valve stem is inserted into the second valve stem receiving opening, the collar obstructing passage of compressed air from the first bore into the second valve stem receiving opening when a tire valve stem is inserted into the first valve stem receiving opening.

19. Combination blow gun and tire inflation apparatus comprising a hollow wand having a passageway therethrough and having a first end and a free end, the first end of the wand having a selectively operable valve joined thereto, an elongate body mounted to the free end of the wand, the elongate body having a first end and a second end, the elongate body having an intake bore at the first end thereof, the intake bore communicative with the passageway through the wand, the elongate body having a second bore therethrough with a first opening at the first end of the body, the first opening of the second bore adjacent the first bore, the second bore having a first enlarged diameter segment and a second reduced diameter segment, a passageway interconnecting the first enlarged segment of the second bore and the first bore, a plunger longitudinally moveable within the second bore between a first position and a second position, the plunger obstructing passage of air from the intake bore to the first opening of the second bore when the plunger is in its first position, the plunger obstructing passage of air through the second reduced diameter segment of the second bore when the plunger is in its second position, an orifice interconnecting the second segment of the second bore to a first exit opening at the second end of the elongate body.

20. The tire inflation apparatus of claim 19 wherein the plunger has an annular collar thereon, the collar sized to closely fit in the enlarged diameter segment of the second bore and be freely slidable therein, the plunger having a cylindrical body sized to closely fit within the second reduced diameter segment and be freely slidable therein.

* * * * *

UNITED STATES PATENT AND TRADEMARK OFFICE
CERTIFICATE OF CORRECTION

PATENT NO.    : 6,561,233 B2
DATED         : May 13, 2003
INVENTOR(S)   : James M. Weems, Donald A. Nye and Douglas A. Thomas It is certified that error appears in the above-identified patent and that said Letters Patent is hereby corrected as shown below:

<u>Title page,</u>
Item [75], Inventors, delete "James M. Weems, Cedar Rapids, IA (US)".

Signed and Sealed this

Twenty-first Day of October, 2003

JAMES E. ROGAN
*Director of the United States Patent and Trademark Office*